United States Patent [19]
Bonney, Jr.

[11] 3,828,638
[45] Aug. 13, 1974

[54] METHOD AND APPARATUS FOR PRODUCING WINDSHIELD WIPER BLADES

[75] Inventor: John L. V. Bonney, Jr., Columbus, Ohio

[73] Assignee: Perma-Blade, Inc., Columbus, Ohio

[22] Filed: Aug. 2, 1972

[21] Appl. No.: 277,387

[52] U.S. Cl............ 83/356.1, 83/365, 83/370, 83/405, 83/408, 83/444, 83/518, 83/519
[51] Int. Cl............................................. B26d 9/00
[58] Field of Search....... 83/47, 255, 365, 405, 408, 83/444, 450, 518, 477.2, 519, 370, 356.1

[56] References Cited
UNITED STATES PATENTS

| | | | |
|---|---|---|---|
| 1,734,643 | 11/1929 | Olsen | 83/444 |
| 2,757,703 | 8/1956 | Harter | 83/444 X |
| 2,852,074 | 9/1958 | Wahl et al. | 83/405 X |
| 3,236,134 | 2/1966 | Howell, Jr. | 83/255 X |
| 3,498,167 | 3/1970 | Hill | 83/255 X |

Primary Examiner—Frank T. Yost
Attorney, Agent, or Firm—Palmer Fultz, Esq.

[57] ABSTRACT

A method and apparatus for continuously producing wiper blades from a continuous strip of moving flexible material such that the blades are provided with longitudinally extending cavities as well as side orifices which communicate with the cavity and adapt the blade to expel washing fluid to the blade edge along the entire longitudinal extent of the blade.

1 Claim, 2 Drawing Figures

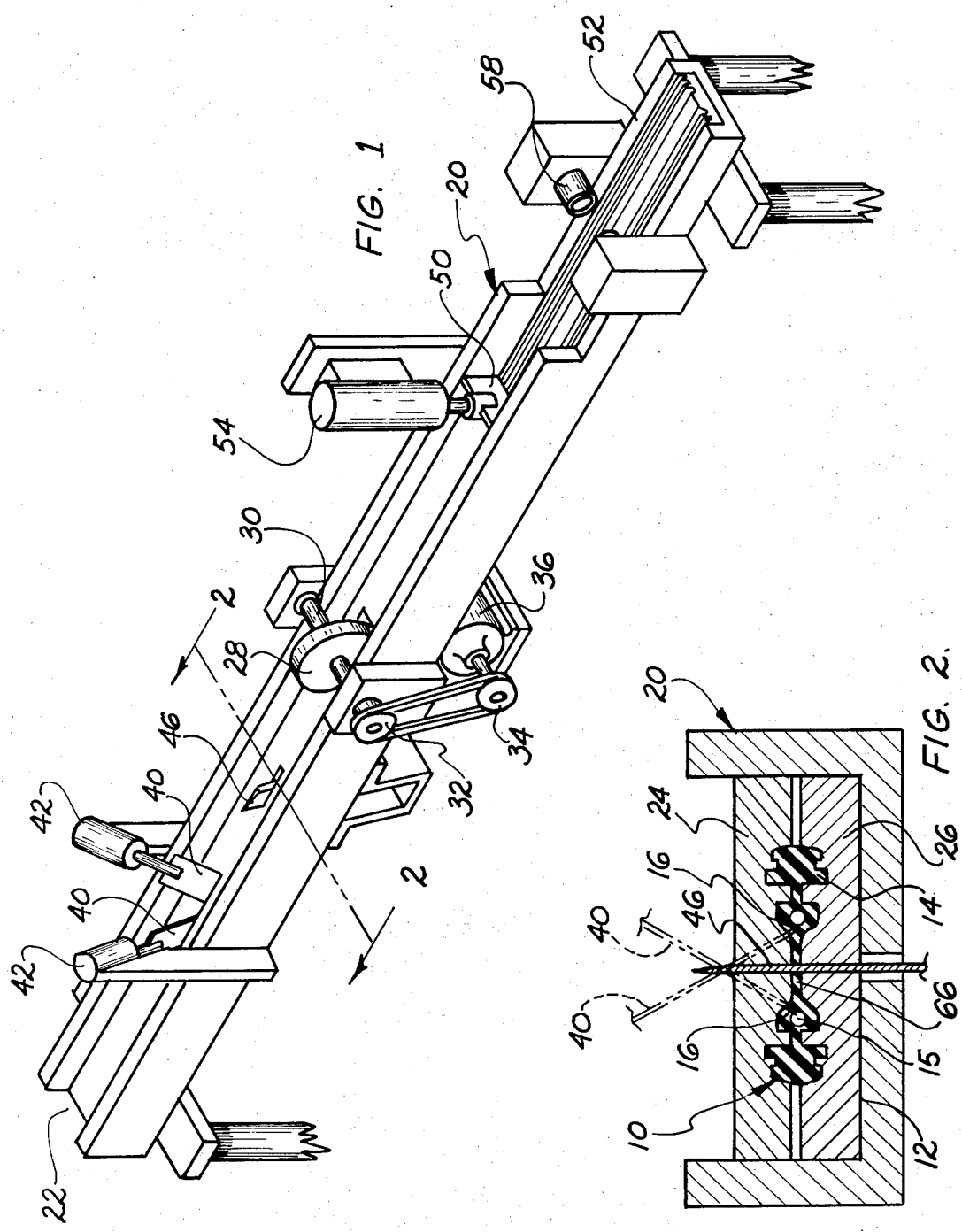

METHOD AND APPARATUS FOR PRODUCING WINDSHIELD WIPER BLADES

BACKGROUND OF THE INVENTION

This invention relates to a method and apparatus for fabricating windshield wiper blades from extruded flexible material.

SUMMARY OF THE INVENTION

In general, the apparatus of the present invention comprises a machine for receiving a continuous strip of extruded flexible material which strip has a cross-sectional shape conforming to the cross-sectional shape of a finished wiper blade.

The moving strip of material is successively delivered to a plurality of stations on the machine at which stations it is sequentially pierced to provide outlet orifices for cleaning fluid, severed to separate the strip into a plurality of blade blanks formed in side by side relationship, and finally severed at the end of the machine so as to continuously produce wiper blades of uniform configuration and predetermined shape and size.

As a primary aspect of the present invention the method and apparatus is uniquely adapted to fabricate wiper blades of the type disclosed in my co-pending application Ser. No. 277,923 filed Aug. 4, 1972.

As another aspect of the present invention, the novel machine is adapted to accurately maintain the moving flexible strip with respect to both its position and shape as it is successively presented to stations at which various operations are performed.

It is therefore an object of the present invention to provide an improved method and apparatus for continuously fabricating wiper blades from an extruded flexible strip such that the blades are adapted for a combined wiping and washing function.

It is another object of the present invention to provide a novel method and apparatus for fabricating wiper blades from extruded flexible material which permit the formation of a wiping edge of controlled shape ranging from flat to various amounts of concave configuration.

Further objects and advantages of the present invention will be apparent from the following description, reference being had to the accompanying drawings wherein a preferred form of embodiment of the invention is clearly shown.

BRIEF DESCRIPTION OF THE DRAWINGS:

FIG. 1 is a perspective view of a machine constructed in accordance with the present invention; and FIG. 2 is a sectional view taken along the line 2—2 of FIG. 1.

DESCRIPTION OF THE PREFERRED EMBODIMENT

Referring in detail to the drawings, a machine constructed in accordance with the present invention is illustrated in FIG. 1 and includes a channel shape frame indicated generally at 20.

The strip of extruded flexible material enters the machine at 22 and thereafter is pulled between upper and lower holding blocks 24 and 26. As seen in FIG. 1 the flexible material is drawn through the upper and lower holding blocks 24 and 26 by a wheel 28 which frictionally engages the top of the moving strip. Wheel 28 is driven by shaft 30, pulley 32, pulley 34, and motor 36.

Referring again to FIG. 1 the orifices along the length of the flexible material are formed by slitting blades or punches 40 which are sequentially driven by power cylinders 42, such cylinders can be driven by cam action by a suitable linkage driven by motor 36.

As seen in FIG. 2, the strip of flexible material indicated generally at 10 includes a left side portion 12 and a right side portion 14 the latter being a mere image of the former.

The right and left strip portions 12 and 14 are split at a cutting station which includes a dividing knife 46 which extends upwardly through the bottom of the frame and into the upper and lower holding blocks 24 and 26.

It should be mentioned that the slitting or punching blades 40 are seen in FIG. 2 and serve to form side orifices 16 in both of the left and right side portions 12 and 14. Each orifice communicates with a central longitudinally extending cavity 15 in its left and right side portions 12 and 14.

As seen in FIG. 1 an air operated guillotine type cutting bar 50 is mounted near the exit end 52 of the machine and driven by a power cylinder 54. Such power cylinder can be cam actuated by suitable mechanism, not illustrated, driven by motor 36 so as to cut off the wiper blades in timed relationship with the operations performed at the other stations of the machine.

Power cylinder 54 can also be actuated by a photo electric cell assembly 58 so as to operate cutting bar 50 when the strip has progressed to the proper position.

It should be mentioned that the cavity in upper and lower holding blocks 24 and 26 conform with the shape of the extruded flexible material.

With reference to upper and lower holding blocks 24 and 26 the pressure exerted by such blocks on the flexible material can be increased or decreased so as to stretch the web portion 66 while it is being severed by dividing knife 46. In this manner a variation in wiper edge configuration can be obtained with various shapes between flat and concave being obtainable merely by varying the vertical clamping pressure between holding blocks 24 and 26.

While the form of embodiment of the present invention as herein disclosed constitutes a preferred form, it is to be understood that other forms might be adopted.

I claim:

1. A machine for continuously producing wiper blades from a strip of flexible material in the form of side by side wiper blades joined together at web portions provided with a longitudinally extending cavity, said machine comprising, in combination frame means; guide means on said frame means comprising first and second holding blocks defining a guide opening for said strip, the cross-sectional shape of said guide opening conforming substantially to the cross-sectional shape of said side by side wiper blades; slicing means on said frame means including a cutting edge extended through said guide opening for severing said strip at said web portion; a piercing means on said frame means for forming orifices through the side of said strip and into said cavity; means for sequentially actuating said piercing means to form said orifices at longitudinally spaced intervals along said strip; cut-off means on said frame means for severing said strip; and means for sequentially actuating said cut-off means to sever wiper blade elements from said strip.

* * * * *